United States Patent

Briggs

(10) Patent No.: US 7,928,345 B2
(45) Date of Patent: Apr. 19, 2011

(54) AIRCRAFT WINDSHIELD DEFOGGING/DEICING SYSTEM AND METHOD OF USE THEREOF

(75) Inventor: Michael D. Briggs, Owens Crossroads, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 686 days.

(21) Appl. No.: 10/972,234

(22) Filed: Oct. 22, 2004

(65) Prior Publication Data

US 2006/0086715 A1    Apr. 27, 2006

(51) Int. Cl.
*H05B 1/02* (2006.01)

(52) U.S. Cl. ........ 219/488; 219/203; 219/505; 219/543; 219/548; 219/501; 323/369; 363/109; 244/134 D; 244/134 R

(58) Field of Classification Search .................. 219/488, 219/501, 497, 203, 495, 505, 507, 543, 548, 219/482; 323/369; 363/106, 109; 244/134 R, 244/134 D
See application file for complete search history.

(56) References Cited

U.S. PATENT DOCUMENTS

| | | | | |
|---|---|---|---|---|
| 4,128,448 A * | 12/1978 | Bitterice et al. | ............... | 156/166 |
| 4,278,875 A * | 7/1981 | Bain | ............................. | 219/522 |
| 4,587,436 A * | 5/1986 | Cronin | ............................ | 307/21 |
| 4,596,989 A * | 6/1986 | Smith et al. | .................... | 343/709 |
| 4,883,940 A | 11/1989 | Tokarz | .......................... | 219/203 |
| 5,675,238 A | 10/1997 | Asao | ................................ | 322/28 |
| 6,917,019 B2 * | 7/2005 | Richter | ......................... | 219/505 |
| 2002/0089638 A1* | 7/2002 | Ho et al. | ....................... | 349/161 |
| 2003/0127452 A1* | 7/2003 | Gerhardinger et al. | ....... | 219/497 |
| 2003/0155467 A1* | 8/2003 | Petrenko | ................... | 244/134 R |

FOREIGN PATENT DOCUMENTS

| | | |
|---|---|---|
| EP | 0 437 700 A2 | 11/1990 |
| GB | 2 261 333 A | 5/1993 |
| GB | 2 293 253 A | 3/1996 |
| RU | 2183379 C1 | 6/2002 |

* cited by examiner

*Primary Examiner* — Mark H Paschall
(74) *Attorney, Agent, or Firm* — Andrew C. Siminerio

(57) ABSTRACT

In an aircraft windshield defogging/deicing system, a pair of transparent sheets maintained in spaced facing relation by a transparent interlayer have a resistive coating positioned between the transparent sheets. An inverter is provided for applying to the resistive coating a square wave or quasi-square wave AC signal. In response to receiving this AC signal, the resistive coating generates heat, which reduces or avoids the accumulation of moisture or ice on the aircraft windshield.

30 Claims, 3 Drawing Sheets

AIRCRAFT WINDSHIELD DEFOGGING/DEICING SYSTEM AND METHOD OF USE THEREOF

BACKGROUND OF THE INVENTION

1. Field of the Invention

The present invention relates to aircraft windshields and, more particularly, to defogging/deicing aircraft windshields.

2. Description of Related Art

Today's aircraft windshield defogging/deicing systems generally include a resistive coating deposited on an inner surface of one of a plurality of transparent layers, which are laminated and held together via transparent interlayers. Many of the resistive coatings in use today are optimally powered with DC electrical power that is available on the aircraft for powering other systems, such as avionic systems. However, certain resistive films are optimally powered by AC electrical power. Heretofore, this AC electrical power was supplied by an inverter, which inverted the DC electrical power into AC electrical power having a sinusoidal waveform.

A drawback of utilizing an inverter to invert DC electrical power into AC electrical power having a sinusoidal waveform is that the inverter must be configured to perform this function. In order to output a sinusoidal AC waveform, however, the inverter needs components, such as filter capacitors and/or filter inductors, which add weight and cost to the inverter.

What is, therefore, needed, and not disclosed in the prior art, is an aircraft windshield defogging/deicing system that overcomes the above drawbacks and others. Still other drawbacks that the present invention overcomes will become apparent to those of ordinary skill in the art upon reading and understanding the following detailed description.

SUMMARY OF THE INVENTION

The present invention provides an aircraft windshield defogging/deicing system having a pair of transparent sheets maintained in spaced facing relation by a transparent interlayer, a resistive coating positioned between the transparent sheets, for example between the interlayer and one of the transparent sheets, and an arrangement for applying a square wave or quasi-square wave AC signal to the resistive coating.

The resistive coating is desirably a transparent film that has been deposited on the one transparent sheet. In one non-limiting embodiment, the AC signal can have a duty cycle that varies in a range from 0% and 100% over a time period of 1 second, e.g. ranging from 25% and 75% and/or a frequency ranging from 25 and 1000 Hertz.

The arrangement for applying the AC signal can include an inverter for inverting an input DC signal into the AC signal and a controller responsive to the input DC signal for outputting to the inverter one or more control signals, which cause the inverter to invert the input DC signal to the AC signal. The AC signal can be an AC voltage and the DC signal can be a DC voltage. In one non-limiting embodiment of the invention, the DC voltage can have a value ranging from 24 and 32 volts DC and the AC voltage can have a value ranging from 115 and 230 volts AC.

The system can further includes a switch, such as a relay, a transistor, etc., for selectively connecting the means for applying to a DC power source.

The DC power source can be a DC generator that is driven by an internal combustion engine of the aircraft. The internal combustion engine can be a jet engine and/or a reciprocating engine.

The resistive coating can be comprised of indium tin oxide (ITO) having a resistivity no greater than one of 50 ohms/square, for example no greater than 25 ohms/square or no greater than 10 ohms/square.

Each transparent sheet can be comprised of glass or polycarbonate. The interlayer can be comprised of polyvinyl butyral.

The invention also provides an aircraft windshield defogging/deicing system that includes a glass deicing coating formed on a first transparent sheet comprising the aircraft windshield, inverter circuitry coupled to the glass deicing coating, and a controller for causing the inverter circuitry to invert DC power into an AC power having a square wave or quasi square waveform.

The AC power can have a square wave or a quasi-square wave waveform, a duty cycle that varies in a range from 0% and 100%, for example ranging from 25%-75%, and a fixed frequency, for example ranging from 25-1000 Hertz.

The aircraft windshield can further include a second transparent sheet coupled to the first transparent sheet by a transparent interlayer. The glass deicing coating can be sandwiched between the first transparent sheet and the transparent interlayer.

Each transparent sheet can be comprised of a glass sheet or a polycarbonate sheet. The transparent interlayer can be comprised of polyvinyl butyral.

The source of the DC power can be a DC generator that is driven by an engine of the aircraft. The glass deicing coating can be comprised of indium tin oxide (ITO). The glass deicing coating desirably has a resistivity no greater than 50 ohms/square, for example no greater than 25 ohms/square or no greater than 10 ohms/square.

The present invention further provides a method of defogging/deicing an aircraft windshield. The method includes providing an aircraft having a windshield including a resistive coating on a surface thereof other than the surface of the windshield that is exposed to the exterior of the aircraft, coupling inverter having a controller for controlling the operation of the circuitry between the resistive coating and a source of DC electrical power, causing the inverter circuitry to invert the DC electrical power into an AC electrical power having a square wave or quasi-square wave waveform, and supplying the AC electrical power to the resistive coating.

DETAILED DESCRIPTION OF THE INVENTION

The present invention will be described with reference to the accompanying figures where like reference numbers correspond to like elements.

All numbers expressing dimensions, physical characteristics, performance criteria and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Figure 1:
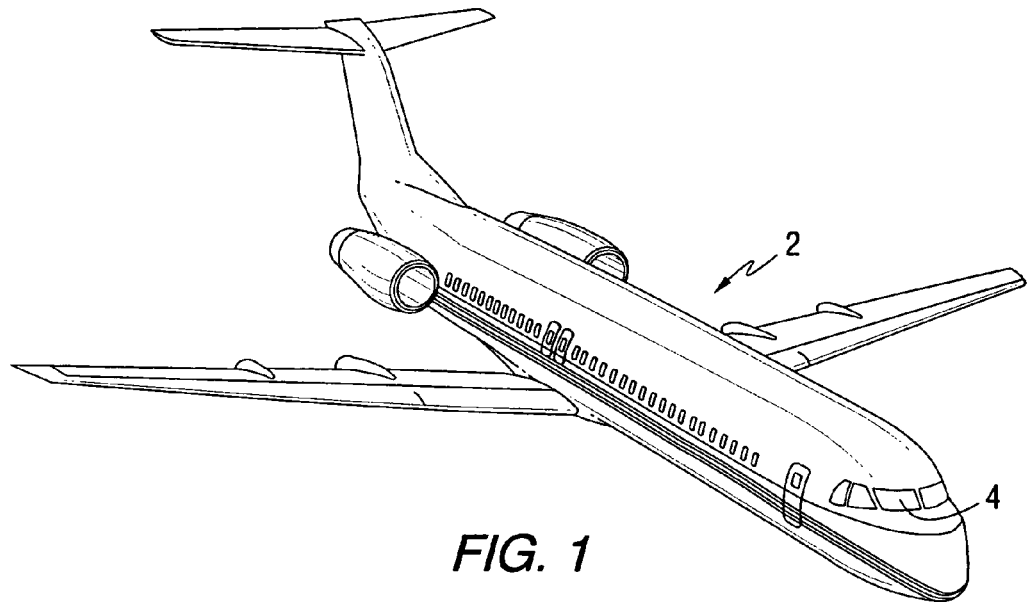
FIG. 1 is a perspective view of an aircraft including windshields that can utilize the windshield defogging/deicing system of the present invention.
Figure 2:
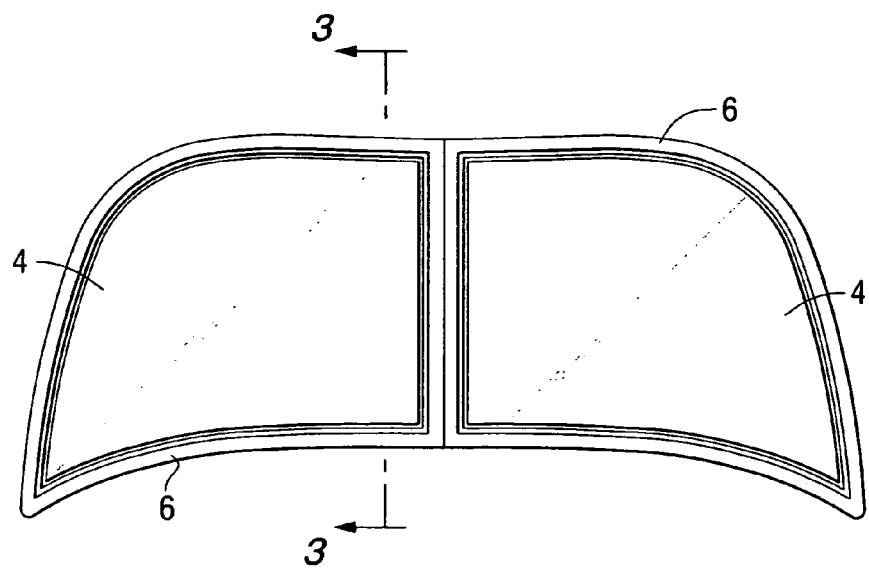
FIG. 2 is an isolated enlarged view of the windshields of FIG. 1.
Figure 3:
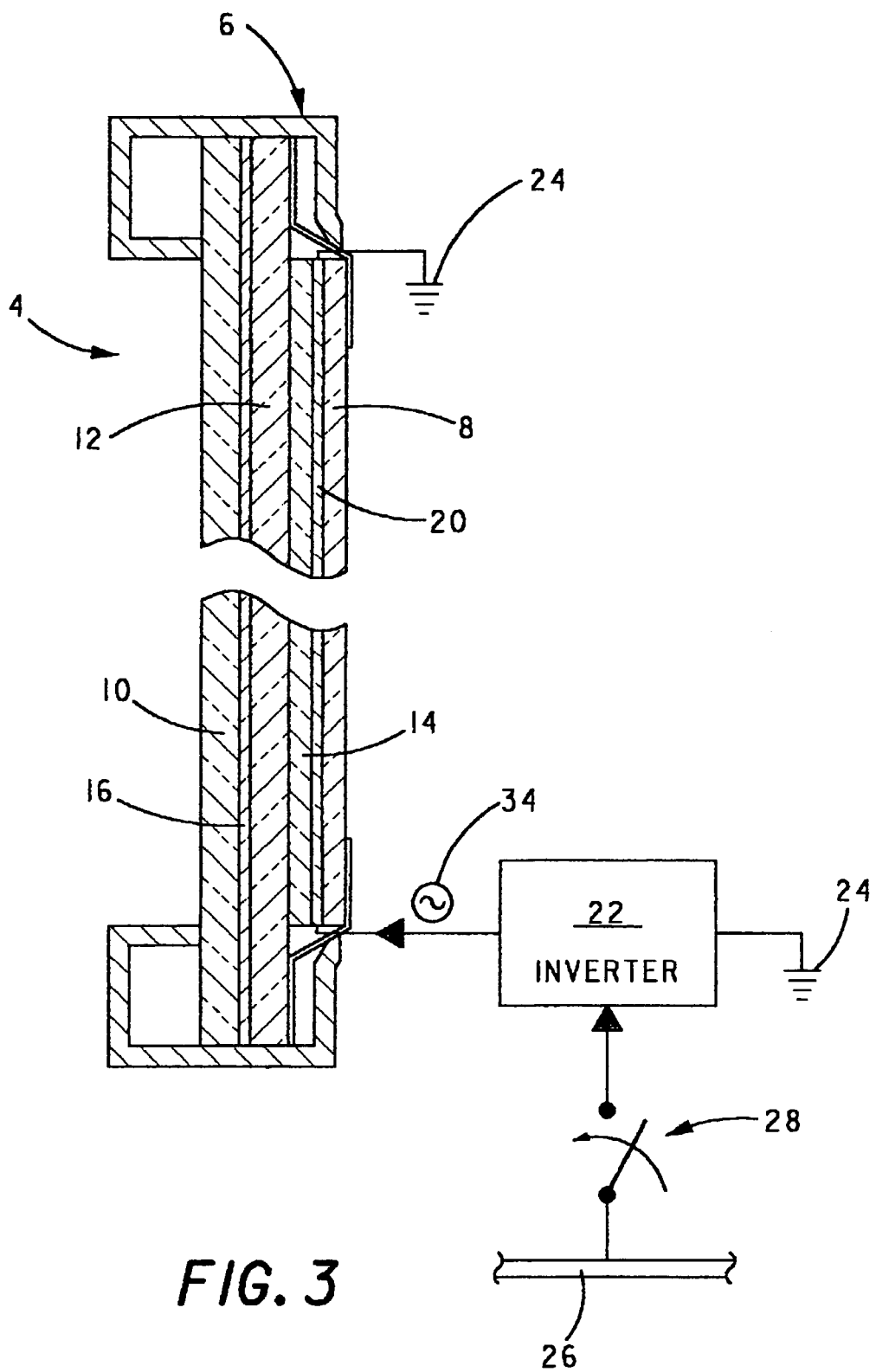
FIG. 3 is a cross-section taken along lines III-III in FIG. 2 showing a resistive coating coupled to an inverter for supplying AC electrical power thereto.

With reference to FIGS. 1-3, an aircraft 2, such as a winged aircraft as shown or a helicopter (not shown), typically includes one or more windshields 4 positioned adjacent the fore or front end thereof.

Each windshield 4 desirably has a form that conforms to the shape of the corresponding aircraft 2 where each windshield 4 is installed. To facilitate attachment to aircraft 2, each windshield 4 includes a support frame 6 that surrounds the windshield and provides a mechanical interface between the windshield 4 and the body of aircraft 2 for connecting windshield 4 to aircraft 2.

A typical windshield 4 includes at least two transparent sheets joined together by a transparent interlayer. In the non-limiting embodiment of windshield 4 shown in FIG. 3, the transparent sheets include outer glass layer 8, inner glass layer 10, and intermediate glass layer 12. Glass layers 8, 10 and 12 are typically heated and bent to a desired curved configuration. Outer glass layer 8 and intermediate glass layer 12 are joined together in facing relationship by a first transparent interlayer 14. Inner glass layer 10 and intermediate glass layer 12 are joined together in facing relationship by a second transparent interlayer 16. Although not required, each interlayer can be polyvinyl butyral. Outer glass layer 8, first interlayer 14, intermediate glass layer 12, second interlayer 16 and inner glass layer 10 are bonded together in a manner well known in the art. Accordingly, a detailed description of how this bonding occurs will not be included herein for simplicity of description.

In use, it is not uncommon for windshield 4 to accumulate moisture or ice on the exposed surface of outer glass layer 8 due to climatic conditions. In order to overcome this accumulation, whereupon the operator of aircraft 2 retains an unimpeded view through windshield 4, a system is provided for the defogging/deicing windshield 4. This system includes a resistive coating 20 coupled to an inverter 22 and a signal ground 24. Inverter 22 is coupled to a source of DC electrical power, such as a DC buss 26, via a switch 28. Switch 28 can be any suitable and/or desirable switch, such as a mechanical switch, a power transistor, and the like.

Figure 4:
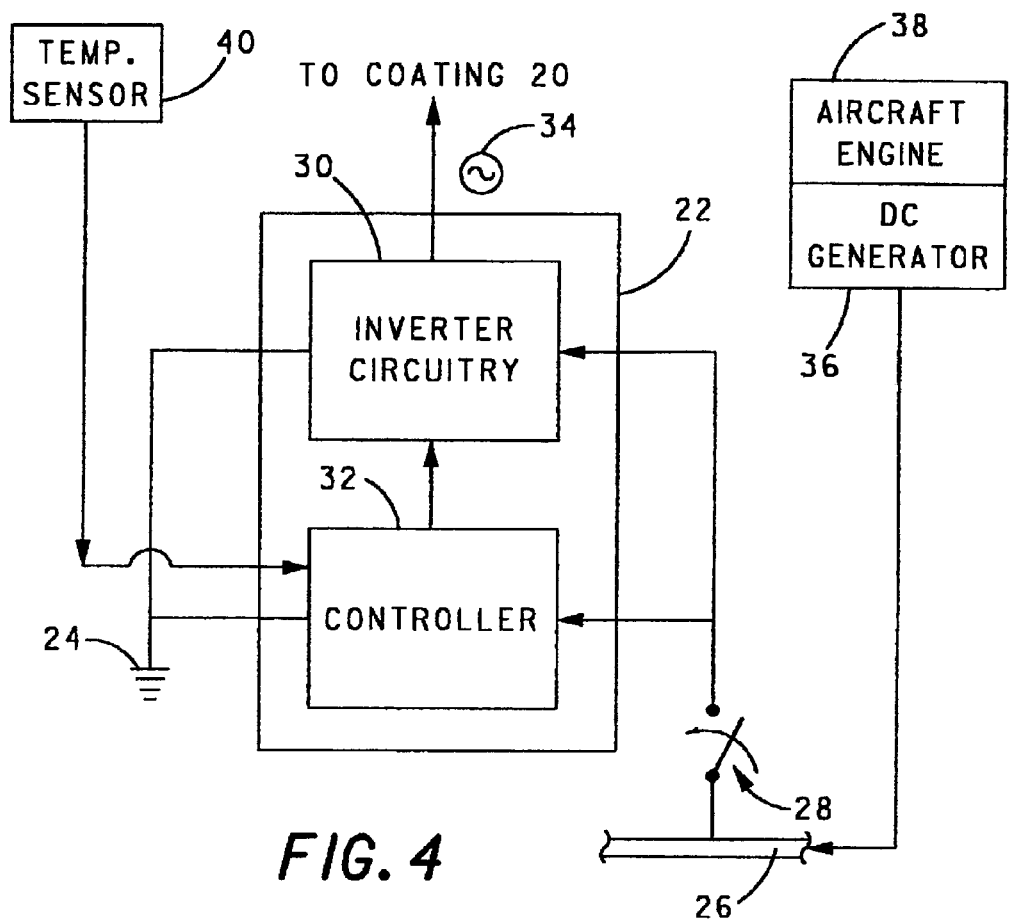
FIG. 4 is an block diagram of the internal components of the inverter shown in FIG. 3 coupled to an aircraft engine driven DC generator via a DC buss.

With reference to FIG. 4 and with continuing reference to FIG. 3, inverter 22 of the present invention includes a single phase DC-to-AC inverter circuitry 30 coupled to a controller 32. Since conventional inverter circuitry 30 is well known in the art, and since the internal components of inverter circuitry 30 are not relevant to the present invention, details regarding the components of inverter circuitry 30 have not been included herein for simplicity of description. In the nonlimiting embodiment of the present invention shown in FIG. 4, controller 32 is shown as being positioned within the inverter 22 housing. However, it should be appreciated that the controller can be a separate element positioned external to and remote from the inverter 22 housing.

In operation, in response to closure of switch means 28, controller 32 outputs to inverter circuitry 30 suitable control signals that cause inverter circuitry 30 to invert DC electrical power received from DC buss 26 into single phase AC electrical power which is output to resistive coating 20. In response to being supplied with the AC electrical power output by inverter circuitry 30, resistive coating 20 produces sufficient heat to either avoid the formation of moisture or ice on the outer surface of outer glass layer 8 and/or to reverse the accumulation of moisture or ice on the exposed surface of outer glass layer 8.

In one non-limiting embodiment, resistive coating 20 is a transparent film that has been deposited, e.g., sputtered, on the inner surface of outer glass layer 8. One embodiment of resistive coating 20 is a NESATRON® indium tin oxide (ITO) coating available from PPG Industries, Inc. or a NESA® tin oxide coating also available from PPG Industries, Inc. However, the recital of these particular coatings is not to be construed as limiting the invention since the use of any suitable resistive conductive coating is envisioned.

In one embodiment of the present invention, resistive coating 20 has a resistivity no greater than 50 ohms per square, for example no greater than 25 ohms per square or no greater than 10 ohms per square. However, this is not to be construed as limiting the invention. In the embodiment shown in FIG. 3, layers 8, 10 and 12 are formed from glass. However, this is not to be construed as limiting the invention since any one or more of these layers can be formed from polycarbonate or other suitable transparent materials.

Figure 5:
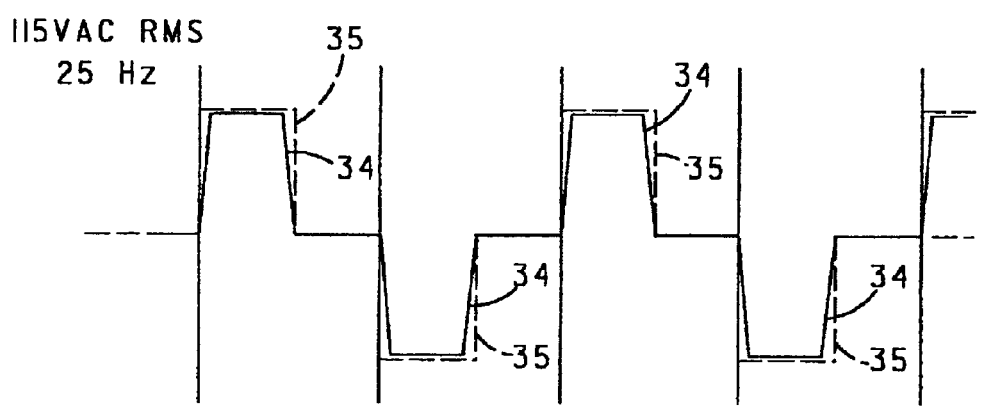
FIG. 5 shows an exemplary waveform output by the inverter of FIG. 3 in operation.

With reference to FIG. 5, and with continuing reference to FIGS. 3 and 4, the AC electrical power output to resistive coating 20 is desirably one of a square wave AC signal 35 or a quasi-square wave AC signal 34. During operation, the amount of power delivered to the coating 20 is either 0%, i.e. power off, or 100%, i.e. power fully on. The amount of time that the power can vary based on, e.g. the atmospheric conditions outside the aircraft 2. More specifically, as used herein, the term "duty cycle" means the ratio or percentage of (a) the amount of time that power is delivered to the coating during a specified period of continuous operation versus (b) the total specified period of operation. For example, if over a 2 minute period, the power is delivered to the coating for 1 minute, the duty cycle would be ½, or 50%. In the present invention, at any given time during operation, the duty cycle can be any value ranging from 0% to 100% over a time period as short as 1 second, and can change many times during operation. In one nonlimiting embodiment of the invention, the duty cycle varies in response to the temperature of the windshield 4. The temperature of the windshield 4 can be monitored during flight in any manner well know in the art, e.g. by a temperature sensor 40 positioned on or within the windshield. In one nonlimiting embodiment of the invention, the temperature sensor 40 is positioned on the same internal surface of the windshield as the resistive coating 20. In operation, the temperature sensor 40 is used to monitor the temperature of the windshield 4 and based on the windshield temperature, the controller 32 establishes the duty cycle required to maintain the windshield clear of any icing and/or fogging. It should be appreciated that the duty cycle can also be preset and not controlled by the temperature sensor. In one nonlimiting embodiment, the AC signal has a duty cycle ranging from 0% and 100% over a time period of 1 second, e.g. from 10% to 90%, or 25% and 75%, and/or a frequency ranging from 25 Hertz and 1000 Hertz. However, these ranges of duty cycle and frequency are not to be construed as limiting the invention. In one non-limiting embodiment, inverter circuitry 30 inverts DC electrical power, for example ranging from 24-32 volts DC, supplied by DC buss 26 into an AC electrical power having a value of ranging from 115 and 230 volts AC RMS. However, this is not to be construed as limiting the invention since the use of other ranges of DC electrical power and/or AC electrical power are envisioned. In one non-limiting embodiment of the invention, inverter circuitry 30 inverts 28 volts DC into 115 volts AC.

With reference back to FIG. 4, the DC electrical power supplied to DC buss 26 can originate from a DC generator 36 which is driven by an aircraft engine 38 in a manner known in the art. Aircraft engine 38 can be an internal combustion engine such as a jet engine or a reciprocating engine. However, this is not to be construed as limiting the invention.

In a method of deicing an aircraft windshield 4, aircraft 2 is provided with windshield 4 having glass defogging/deicing or resistive coating 20 on a surface of a ply thereof other than the surface of the windshield that is exposed to the exterior of the aircraft. Inverter circuitry 30, having controller 32 for controlling the operation thereof, is coupled between resistive coating 20 and DC generator 36. At a suitable time, switch means 28 connects DC buss 26 to controller 32 and inverter circuitry 30. In response to switch means 28 forming this connection, controller 32 causes inverter circuitry 30 to invert the DC electrical power provided by DC buss 26 into AC electrical power having either a square wave or a quasi-square wave waveform, a fixed duty cycle, for example ranging from 25% and 75% over a 1 second time period, and a fixed frequency, for example ranging from 25 Hertz and 1000 Hertz. As discussed above, although not limiting in the present invention, the duty cycle can be linked to the temperature of the windshield. The thus produced AC electrical power is supplied to resistive coating 20, which responds to the supply of AC electrical power by producing heat of sufficient extent to avoid or reduce the accumulation of moisture and/or ice on the exposed surface of outer glass layer 8. In one non-limiting embodiment, the DC power is converted to AC power having a fixed duty cycle of 50% over a 1 second time period and a fixed frequency of 25 Hz.

Configuring inverter circuitry 30 to output a fixed frequency square wave or quasi-square wave signal having a fixed modulation duty cycle enables inverter circuitry 30 to be constructed with a minimum number of components, e.g. large filter capacitors and/or inductors, whereupon the weight, size and cost of the inverter 22 can be less than inverters in use today that output sinusoidal waveforms. In one non-limiting embodiment, configuring inverter circuitry 30 to output the fixed frequency square wave or quasi-square wave signal enables the overall weight of inverter 22 designed for use with aircraft windshield to be reduced to no more than 8 lbs., for example no more than 6 lbs., or no more than 5 lbs.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An aircraft windshield defogging/deicing system comprising:
   a pair of transparent sheets maintained in spaced facing relation by a transparent interlayer;
   a resistive coating positioned between the pair of transparent sheets; and
   an inverter for applying a square wave or quasi-square wave AC signal to the resistive coating;, wherein:
   the inverter includes inverting circuitry for inverting an input DC signal into the AC signal, and a controller responsive to the input DC signal for outputting to the inverter one or more control signals which cause the inverter to invert the input DC signal into the AC signal;
   the AC signal is an AC voltage;
   the DC signal is a DC voltage;
   the DC voltage has avalue ranging from 24-32 volts DC; and the AC voltage has a value ranging from 115-230 volts AC RMS.

2. The system of claim 1, wherein the DC voltage is 28 volts DC and the AC voltage is 115 volts AC RMS.

3. The system of claim 1, wherein the coating is between the transparent interlayer and one of the pair of transparent sheets.

4. The system of claim 3, wherein the resistive coating is a transparent film that has been deposited on the one of the pair of transparent sheets.

5. The system of claim 1, wherein each one of the pair of transparent sheets is selected from glass and polycarbonate, and the interlayer is comprised of polyvinyl butyral.

6. The system of claim 1, wherein the AC signal has at least one of the following properties: a duty cycle ranging from 0%-100% over a 1 second time period and a frequency ranging from 25-1000 Hertz.

7. The system of claim 6, wherein the AC signal has a duty cycle ranging from 25%-75% over a 1 second time period.

8. The system of claim 1, further including a temperature sensor to monitor windshield temperature, wherein the AC signal has a duty cycle that varies in response to the windshield temperature.

9. The system of claim 1, wherein the inverter weighs no more than 8 lbs.

10. The system of claim 9, wherein the inverter weighs no more than 6 lbs.

11. The system of claim 1, further including a switch for selectively connecting the inverter to a DC power source.

12. The system of claim 11, wherein the DC power source is a DC generator that is driven by an internal combustion engine.

13. The system of claim 12, wherein the internal combustion engine is at least one of a jet engine and a reciprocating engine.

14. The system of claim 1, wherein the resistive coating has a resistivity of no greater than 50 ohms/square.

15. The system of claim 14, wherein the resistive coating has a resistivity of no greater than 25 ohms/square.

16. The system of claim 15, wherein the resistive coating has a resistivity of no greater than 10 ohms/square.

17. The system of claim 14, wherein the resistive coating is selected from indium tin oxide and tin oxide.

18. The system of claim 1, further including a temperature sensor to monitor windshield temperature, wherein the AC signal has a duty cycle that varies in response to the windshield temperature.

19. An aircraft windshield defogging/deicing system comprising:
   a glass deicing coating formed along a first transparent sheet comprising the aircraft windshield;
   inverter circuitry coupled to the glass deicing coating; and
   a controller for causing the inverter circuitry to invert DC power into AC power having a square wave or quasi-square wave waveform, wherein the DC power is a DC voltage ranging from 24-32 volts DC, and the AC power is an AC voltage ranging from 115-230 volts AC RMS and having a duty cycle ranging from 0%-100% and a frequency between 25-1000 Hertz.

20. The system of claim 19, wherein the AC power has a duty cycle ranging from 25%-75% over a 1 second time period.

21. The system of claim 19, wherein the DC voltage is 28 volts DC and the AC voltage is 115 volts AC RMS.

22. The system of claim 19, wherein the AC power has at least one of the following properties: a duty cycle ranging from 0%-100% over a 1 second time period and a frequency ranging from 25-1000 Hertz.

23. The system of claim 22, wherein the AC power has a duty cycle ranging from 25%-75% over a 1 second time period.

24. The system of claim 19, wherein the aircraft windshield further includes a second transparent sheet coupled to the first transparent sheet by a transparent interlayer.

25. The system of claim 24, wherein the glass deicing coating is positioned between the first transparent sheet and the transparent interlayer.

26. The system of claim 25, wherein each of the first and second transparent sheets is selected from a glass sheet and a polycarbonate sheet, and the transparent interlayer is comprised of polyvinyl butyral.

27. The system of claim 19, further including a temperature sensor to monitor windshield temperature, wherein the AC power has a duty cycle that varies in response to the windshield temperature.

28. The system of claim 19, wherein a source of the DC power is a DC generator, which is driven by an engine of the aircraft.

29. The system of claim 19, wherein the glass deicing coating is comprised of indium tin oxide or tin oxide.

30. The system of claim 19, wherein the glass deicing coating has a resistivity of no greater than 50 ohms/square.

* * * * *